(12) United States Patent
Macannuco et al.

(10) Patent No.: US 9,053,422 B1
(45) Date of Patent: Jun. 9, 2015

(54) COMPUTER SYSTEM AND METHOD FOR PLANNING A STRATEGY FROM DATA AND MODEL ONTOLOGIES TO MEET A CHALLENGE

(71) Applicant: Lockheed Martin Corporation, Bethesda, MD (US)

(72) Inventors: David J. Macannuco, Winchester, MA (US); James H. Crutchfield, Jr., Oviedo, FL (US); Jeffrey J. Bergenthal, Potomac, MD (US); Deborah J. Wilbert, Boxborough, MA (US); Kevin Dill, Tyngsboro, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 287 days.

(21) Appl. No.: 13/723,460

(22) Filed: Dec. 21, 2012

(51) Int. Cl.
*G06N 5/04* (2006.01)
*G06N 5/02* (2006.01)
*G06N 3/12* (2006.01)

(52) U.S. Cl.
CPC ............... *G06N 5/022* (2013.01); *G06N 3/126* (2013.01)

(58) Field of Classification Search
None
See application file for complete search history.

(56) References Cited

U.S. PATENT DOCUMENTS

| | | |
|---|---|---|
| 6,640,231 B1 | 10/2003 | Anderson et al. |
| 7,027,974 B1 | 4/2006 | Busch et al. |
| 7,496,593 B2 | 2/2009 | Gardner et al. |
| 7,707,091 B1 | 4/2010 | Kauffman et al. |
| 7,809,595 B2 | 10/2010 | Breslin et al. |
| 7,822,770 B2 | 10/2010 | Lemcke et al. |
| 7,941,465 B2 | 5/2011 | Gombert et al. |
| 2004/0024606 A1 | 2/2004 | Chukwu |
| 2008/0010229 A1 | 1/2008 | Lee Shu Tak |
| 2011/0238711 A1 | 9/2011 | Schmeink et al. |

OTHER PUBLICATIONS

Dempster, et al., A real-time adaptive trading system using genetic programming, Quantitative Finance, vol. 1, 2001, pp. 397-413.*

* cited by examiner

*Primary Examiner* — Wilbert L Starks
(74) *Attorney, Agent, or Firm* — Carl M. Napolitano; GrayRobinson, P.A.

(57) ABSTRACT

A computer modeling and simulation framework for analysis automates selection of data, models and visualization outputs for providing an insight into a wide range of scenarios without a priori knowledge of the scenarios. The framework organizes the data and models through an ontology for the data and models. A challenge specification is entered by an analyst via a structured document or natural language input, wherein a reasoner processing component of the system selects relevant data sets and models based on the challenge specification and the data and model ontology. The system may provide confidence indications based on the quality of relevant models and data and executes the selected models using the selected data sets as inputs. Results are stored and visualized resulting data presented for the analyst. A visualization ontology enables the system to select an optimum visualization approach.

24 Claims, 5 Drawing Sheets

COMPUTER SYSTEM AND METHOD FOR PLANNING A STRATEGY FROM DATA AND MODEL ONTOLOGIES TO MEET A CHALLENGE

FIELD OF THE DISCLOSURE

The embodiments relate to creating a relational schema based on a selection of model and ontology data, and in particular to automating a selection of data, models and visualization outputs for providing insight into a wide range of scenarios, such as economic by way of non-limiting example, without a priori knowledge of the scenarios.

BACKGROUND

Strategic planners and policy makers have limited analysis capabilities for solving problems and meeting challenges such as presented in economic scenarios. Typically, a problem set is very broad, thus a planner cannot be expert in all the possible areas and a single model or tool cannot cover the problem space. This leads to decisions being made based on intuition versus based on hard mathematical analysis. Therefore, policy makers lack a desired and often necessary insight to make optimal policy decisions, to understand the effects of the policy decisions and to understand the most likely range of results from these policy decisions.

The rapid pace of change in the 21st century including economic changes, resource shortages, population and demographic changes will create new stresses on world order. In addition to maintaining conventional military capability, conflicts are expected to take on new forms. By way of non-limiting example, economic conflict will be a key battlefield. Given the connectedness of the world's economic infrastructures such as trade, energy and finance, small disruptions can have major impacts. Understanding the dynamics of these new areas of challenge will be essential for strategic planning.

By way of further non-limiting example regarding challenges, the domain of economic, financial, and resource conflict is too large to enable a single tool or model to provide all the potential analysis required to understand the strategic implications of different modes of economic conflict. However many models exist, and more can be created that encompass a portion of the problem space. Similarly, an enormous quantity of relevant data exists, but it exists in a many repositories and formats.

While a variety of teachings and tools are available, there remains a need for modeling and simulating analyses for automating a selection of data, models and visualization outputs to provide insight into a wide range of scenarios without a priori knowledge of the scenarios. Yet further no single model currently exists, nor can we expect that one ever will exist, that will be able one to model the very complex economic, resource, and financial aspects to support effective analysis of Economic Warfare. As a result, there is a need to harness the capabilities of individual models, existing and future, and tie such models together in a meaningful way to enable effective analyses.

The embodiments may satisfy such needs.

SUMMARY

Embodiments provide a modeling and simulation framework for analysis to automate selection of data, models and visualization outputs for providing an insight into a wide range of scenarios without a priori knowledge of the scenarios. The framework may organize the data and models through use of an ontology for the data and models, wherein a computer system may accept a challenge or problem specification entered by an analyst. The specification may be a structured document or natural language input. A reasoner component in the system selects relevant data sets and models based on the specification and the data and model ontology. The system may provide confidence indications based on the quality of relevant models and data. The system executes the selected models using the selected data sets as inputs. The results may be stored and visualized for the analyst. A visualization ontology enables the system to select an optimum visualization approach. A chart may be presented, by way of non-limiting example, based on output data types. Output data may be used iteratively as the analyst or analysts work through a problem or challenge set.

One method aspect may comprise a computer implemented method for planning a strategy. The method may include identifying a challenge, inputting a specification of the challenge into a computer through a user interface operable therewith, and receiving the specification from the user interface by a reasoner processor. A global system of interconnected computer networks may then be searched for locating data and models applicable to the challenge, wherein an ontology data set from the located data and an ontology model set from the located models may be developed. The ontology data set and the ontology model set are stored in a database. A selected data set and at least one selected model of the specification may then be developed by the reasoner processor accessing the database for identifying a solution to the challenge. The selected data set and the selected model may then be tagged for providing appropriate information, wherein the selected model is then executed using the selected data set by an execution engine of the processor for providing results data. The results data resulting from the executed selected model may then be stored in a results database. The results data are represented and relationships between selected results is provided in a visualization ontology. The results data may then be transferred from the results database to a visualization engine of the processor for providing visualized images of the results data resulting from the specification. A visualization image may then be selected, as desired, for describing the challenge in a manner for planning the strategy to meet the challenge.

A system may comprise a reasoner processor and a library database operable with the reasoner processor for locating data and models applicable to the challenge, wherein the reasoner processor develops a selected data set and a selected model of the specification for identifying a solution to the challenge and tagging the selected data set and the selected model for providing information therefor. An execution engine may be operable with the reasoner processor for executing the selected model using the selected data set for providing results data, and a visualization engine operable with the execution engine for representing the results data and relationships therebetween in a visualization ontology for providing visualized images of the results data resulting from the specification.

Systems and methods according to one or more embodiments, provide a framework for supporting a modeling and analysis of areas including economic warfare; resource warfare to include disruption of critical infrastructure, transportation systems, public health systems, food supply, and environment and eco-sphere; and financial warfare, individually and collectively. The modeling and analysis according to one or more embodiments identify possible sources of non-lethal economic, resource and financial threats; establishing a direction, path, and complexity of those threats; identifying possible non-lethal economic, resource, and financial warfare assets a country such as the US may use; and mapping new patterns in economic, financial, and resource warfare to help understand and plan for an uncertain future. For defensive scenarios, the analysis supports detecting how an event or events have occurred; identification of the nature of the event; characterizing the event in terms of the impact, breadth (single, multiple, or complex serial event); attribution of the source; and an implementation of appropriate responses. For offensive scenarios, the analysis may support how to identify that offensive measures are having a desired effect, and a response to counter-measures implemented by the intended target.

The framework may contain non-deterministic models to support the identification and analysis of outliers, such as the ability to very rapidly conduct hundreds of runs, plot the results, and identify the outliers (potential "black swans") for further analysis. The framework provides an agnostic model such that the model will support the integration of any other model. A library of models in the framework will thus grow and evolve over time as new models are identified and integrated as new scenarios are analyzed.

The analysis and "what if" studies may be performed in a single user mode. However, a multi-user capability enables studies to be performed in the absence of key models. The framework may provide a minimal footprint web-based user interface that allows the analysis to be conducted by users from their desktop without requiring the installation of the models and databases. The system may include a simple, intuitive user interface for scenario inputs and outputs, such as slider bars, variable inputs, graphs, tables, and the like, and exact outputs determined through discussions with users.

The one or more embodiments may enable rapid analyses of complex economic problems without requiring the analyst to be an expert in the economic sub-domain. Access is provided to a wide range of data and models and automated methods to access models and data without requiring knowledge of all the available models and data sets.

BRIEF DESCRIPTION OF THE DRAWINGS

Embodiments are described by way of non-limiting example with reference to the accompanying drawings in which.

DETAILED DESCRIPTION

The embodiments will now be described more fully hereinafter with reference to the accompanying drawings, in which embodiments of the are shown by way of illustration and example. The embodiments may, however, be embodied in many forms and should not be construed as limited to the embodiments set forth herein. Rather, these embodiments are provided so that this disclosure will be thorough and complete, and will fully convey the scope to those skilled in the art. Like numerals refer to like elements.

Figure 1:
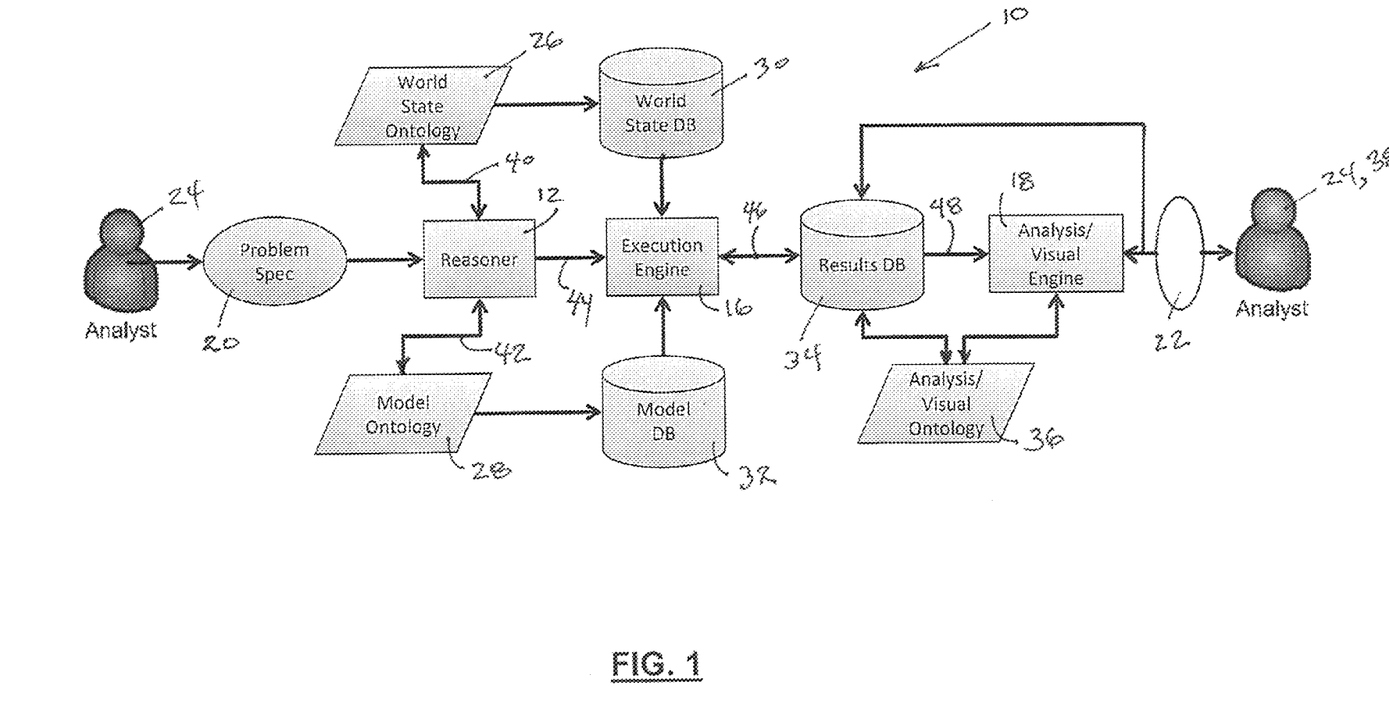
FIG. 1 is a flow chart diagrammatically illustrating one system for planning a strategy in order to meet an identified challenge in accordance with an embodiment.
Figure 2:
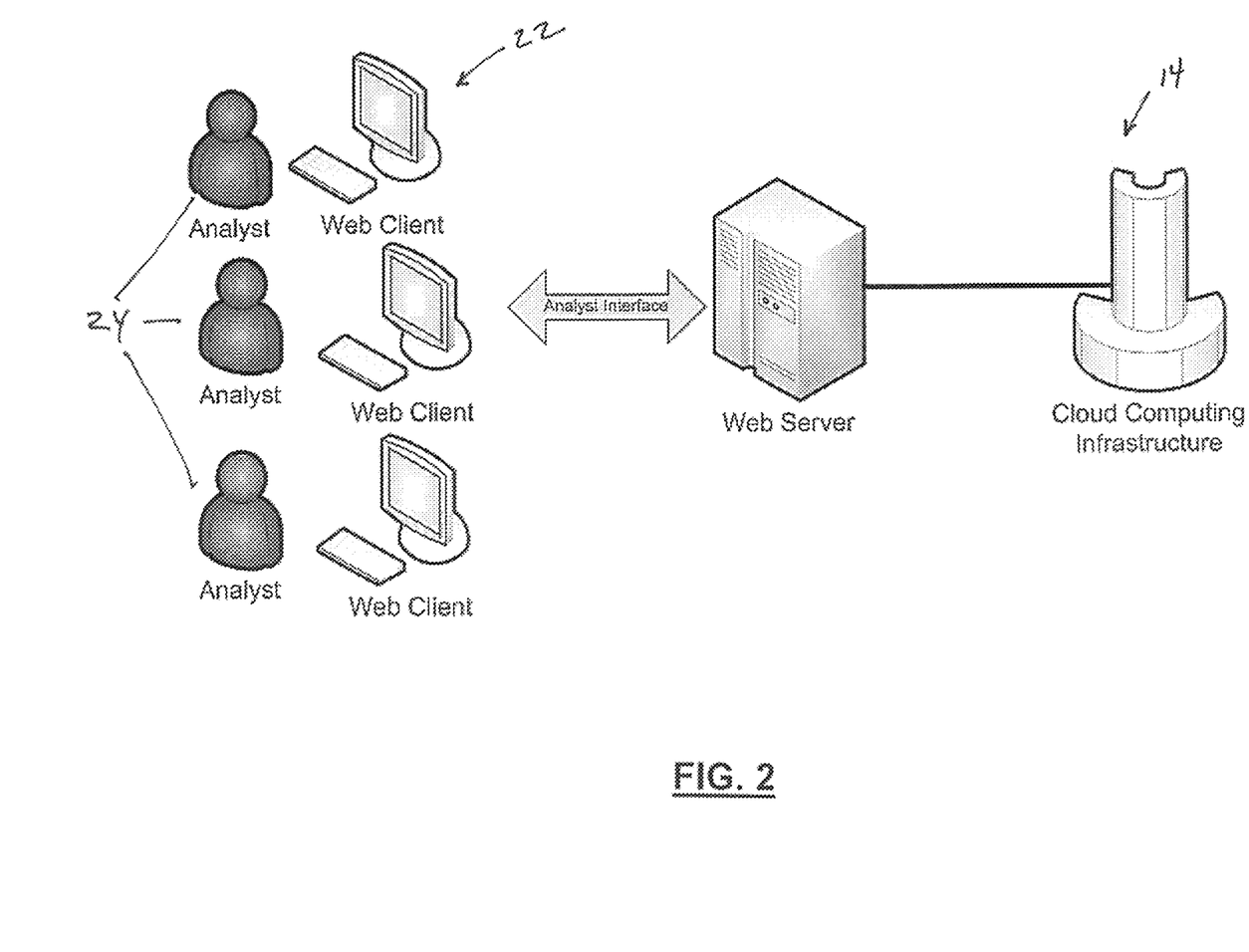
FIG. 2 is a diagrammatical illustration of multiple analysts using the system of FIG. 1 through access to a web server as an interface to a cloud server for access by others.

With reference initially to FIGS. 1 and 2, a computer system 10 for planning a strategy may comprise a reasoner processor 12 operable with a global network 14, such as the Internet, for locating data and models applicable to meeting a challenge or problem presented to the reasoner processor 12. An execution engine 16 may be operable with the reasoner processor 12 for executing a selected model using a selected data set for providing results data to be presented to a visualization engine 18 for representing the results data as visualized images. A first user interface may be operable with the reasoner processor 12 for receiving a specification of a challenge or problem. The first user interface 20 or a second user interface 22 may be operable with the visualization engine 18 for selecting the visualized image of the results data for describing the challenge in a manner for planning the strategy to meet the challenge.

Figure 3:
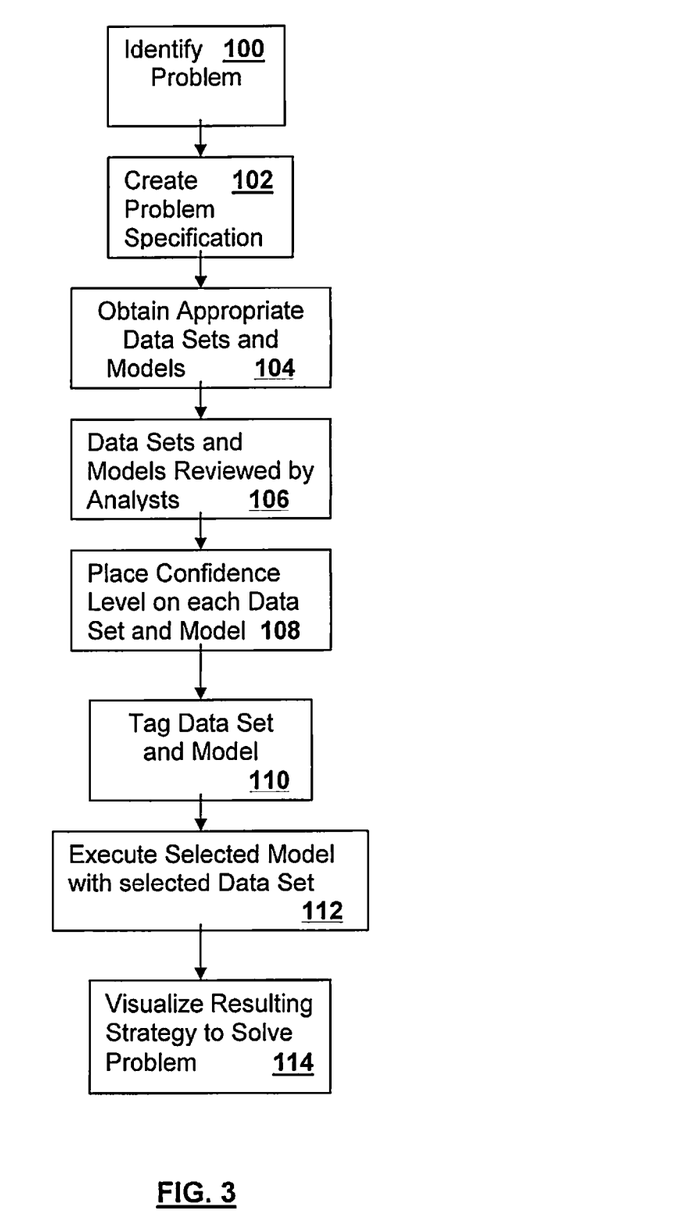
FIG. 3 is a flow chart illustrating one embodiment of a process flow for planning a strategy to solve a problem or meet a defined problem.

With continued reference to FIG. 1, the system 10 is herein described by way of non-limiting example in a computer implemented method for planning a strategy, as illustrated with reference also to FIG. 3, wherein a challenge or problem may be identified 100. An analyst 24 may input a specification of the challenge 102 using the first user interface 20.

The specification may be received from the first user interface 20 by the reasoner processor 12, where a global system of interconnected computer networks, such as the Internet, or a source of available data are accessed for locating data and models applicable to the challenge 104. The reasoner processor 12 may process an ontology data set 26 from the located data and an ontology model set 28 from the located models 106. The ontology data set 26 and the ontology model set 28 may be stored in data and model databases 30, 32, respectively. A selected data set and a selected model of the specification may be developed by the reasoner processor 12 accessing the databases 30, 32 for identifying a solution to the challenge.

With reference again to FIG. 3, confidence levels may be placed 108 on the data sets and models, and they may be tagged 110 for providing preselected information about the selected data set and the selected model. The selected model may be executed 112 using the selected data set by the execution engine 16 for providing results data. The results data resulting from the executed selected model may be stored in a results database 34. The results data may be represented in a visual ontology 36 and transferred from the results database 34 to the visualization engine 18 for providing visualized images 114 of the results data resulting from the specification. The analyst 24 or a second analyst 38 using the second user interface 22 may then select a visualized image of the results data for describing the challenge in a manner for planning the strategy.

Ontologies provide a representation of the data and the relationships between data items in the database. The ontologies can be used by other components in the system to make decisions about what data or model or visualization to use for a given problem. The challenge or problem specification may be entered using natural language. By way of non-limiting example, the analyst 24 may enter: "What would be the effect on the GDP of Country A if Country A closed its natural gas pipeline to Country B."

By way of non-limiting example for operation of the embodiment herein described, the reasoner processor 12 may receive a problem specification from the analyst 24 and may use facts stored in the world state ontology 26 and the models stored in the model ontology 28 to formulate one or more solutions. A solution may include a sequence of models, along with appropriate inputs for each model. The inputs for a model may be facts drawn from the world state ontology 26 or from an output or outputs from previous models. For one embodiment of the reasoner processor 12, an internal structure of the reasoner processor 12 may be described as a custom-built STRIPS-style planner, wherein the models are actions, and the facts are preconditions and effects. The reasoner may be knowledge poor and may treat the models and the facts as black boxes. The reasoner processor may not know what they mean, but how they interact. The actual execution of the models may be done by the analyst or by a separate system. Because not every solution will make sense, the analyst may want to sanity check the reasoner processor output to propose possible analyses, and not a definitive answer. However, because the reasoner processor may search exhaustively, it is reasonable to assume that a solution or solutions will be found that the analyst alone may have missed.

A directed search may include the analyst entering: "I want to know fact X given constraints Y and Z." The process includes a conventional backwards-chaining A*-based search from a goal state, such as the state in which fact X is known, to the initial state, such as the state in which only the contents of the world state ontology and the constraints are known. It is understood that multiple solutions may or may not be provided. Alternatively, an open search may include the analyst entering: "If fact X were true, what would that imply?" The process may then search outwards from the initial state to some pre-specified depth, and return interesting reasoner chains. This assumes that the analyst may then be able to define what "interesting."

The specification may also be entered in as a structured document. A structured document could be built using XML or via a computer user interface. By way of non-limiting example the user interface could have fields for selecting economic outputs, nations of interest and starting conditions. Extensible Markup Language (XML) is a markup language created to structure, store, and transport data by defining a set of rules for encoding documents in a format that is both human-readable and machine-readable A structured document representation may include information as illustrated:

<Output>
<Country> Country A </Country>
<Variable> GDP </Variable>
<Output>
<Input>
<Resources Constraint> Named Pipeline </Resources Constraint>
<StartDate>01/01/2013 </StartDate>
<EndDate>12/31/2013 </EndDate>
<Input>
<Simulation>
<StartDate>01/01/2013 </StartDate>
<EndDate>12/31/2013 </EndDate>
<TimeStep> monthly </TimeStep>
<Simulation>

The reasoner processor 12 may accept the problem specification from the user interface 20. The reasoner processor 12 may use the problem specification to find the appropriate data sets and models to provide a desired answer. As illustrated with reference again to FIG. 1, the reasoner processor 12 may comprise a forward and backward chaining reasoner process, which draws from the collection of models (represented by the model ontology 28) and the collection of datasets (represented by the world state ontology 26) in an attempt to find a set of models and data to provide an answer to the problem specification.

By way of non-limiting example for the economic problem herein presented, the reasoner processor 12 would search for a plurality or all models that produce GDP as an output. Multiple models that produce such an output may be found.

The models may then be examined for their inputs and the reasoner processor may find selected models or selected datasets that can supply these inputs. The reasoner processor 12 may also search 40 for data sets which contain the input data. In this non-limiting example, the reasoner processor may look for data sets that contain the amount of natural gas shipped through the Named Pipeline. The reasoner processor may then forward chains by finding models which can accept as inputs the Named Pipeline data set.

The reasoner processor may build these forward and backwards chains and may look 42 for instances when they connect. Once completed model and data chains are established, they may be presented to the analyst for examination. By associating confidence indicators with each model and dataset, the reasoner processor can score each chain based on a function of the confidence indicators. The reasoner processor may reject low scoring chains based on a threshold check. The score may be presented to the analyst. The analyst may select the chains to run or the reasoner processor can select a plurality or all solutions with acceptable confidence scores.

The reasoner processor 12 may pass the accepted chains to the execution engine 16. In order to make the reasoner processor 12 work as desired, every dataset may be tagged with at the following information:

1. Contents: what information does the data set contain?
2. Format: what format is that information stored in?
3. Timescale: what time period does that information cover?
4. Confidence: how confident are we that the information is correct?

Similarly, every model may include the following information:

1. Input Contents & Format: what information does this model require in order to do its work, and what formats will it accept that information in?
2. Outputs: What are the contents, formats, and timescales of each of the outputs (there can be more than one output)?
3. Confidence Functions: Used to map from the confidence of the inputs to the confidence of the outputs.

With continued reference to FIG. 1, the execution engine 16 may receive 44 the model and data chain from the reasoner processor 12 and may ensure that each data set in the chain is retrieved, that each model is executed with the appropriate data and in the appropriate order, and that results are written 46 to the results database 34.

Models may be executed in several ways within the execution engine 16. Models may include code libraries specifically designed to run in the execution engine. In this configuration the code libraries may be stored in the models database 32 and loaded into the execution engine 16 when needed.

Models may be external programs that are stored outside of the models database 32. In this case the models database 32 stores information on how to pass data to the model, how to launch the model on a server, and how to retrieve the results generated by the model.

Models may be virtual machines that are launched in a cloud environment, as illustrated with reference again to FIG. 2. In this case the models database 32 stores information on how to launch the virtual machine, how to pass data to the virtual machine and how to retrieve results from the virtual machine.

All three model approaches may be used by the execution engine. Once the model execution is complete the data is stored in the results database.

It is desirable to have a common language (syntax, semantics, characteristics, and relationships) and data standards to enable the sequencing of model execution and data interchange between the models for coupling appropriate sets of models in support of a specific analysis activity.

With continued reference to FIG. 1, and as above described, the visualization engine 18 receives 48 the output from the results database 34. The visualization engine 18 may select results to be visualized based on the problem specification and may select an appropriate visualization type including chart type, axis scale and color schemes. The visualization engine 18 may associate graphical icons with data. Such as flag based on country of origin, material symbol based on trade category, and the like. By way of non-limiting example, oil could be represented by an oil well icon or gold represented by a gold bar icon. The visualization engine 18 can associate variables with map locations based on the geographic information in the data such as country. As above discussed, access is provided to a wide range of data and models and automated methods to access models and data without requiring knowledge of a plurality of or all the available models and data sets.

Figure 4:
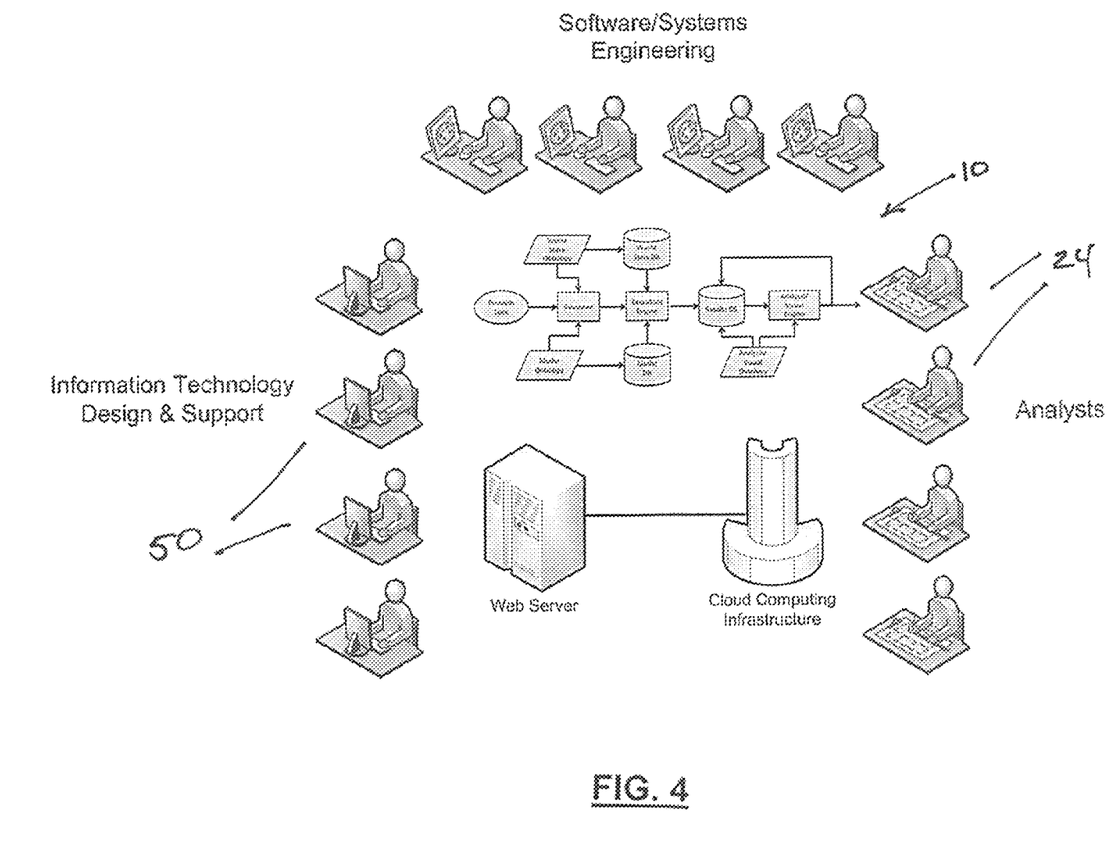
FIG. 4 is a diagrammatical illustration of one analysis center having multiple analysts using the system and method illustrated with reference to FIG. 1 in a cooperative manner to identify and arrive at a strategy for meeting a challenge.

By way of further non-limiting example, a system and method may be provided for economic warfare modeling and analysis and may comprise an economic warfare ontology including a complete set of definitions and taxonomies that describe a standard vocabulary of economic warfare terms and their related meanings. The ontology may provide a framework for representing objects and/or concepts, while facilitating the expression of their specific characteristics and interrelationships. The execution engine may execute the scenario using an appropriate set of models that are coupled in accordance with interrelationships defined in the ontology. Data standards and data architecture may allow for an interchange of data between models, and defines scenario input and output standards. A standard model interface with individual model wrappers, as necessary may allow for an easy integration of new models into the system and conforms to the economic warfare ontology and data standards. An economic warfare model library may contain models of various resolutions, such as simple rule-based and detailed economic, infrastructure, political, and the like models. Models from authoritative sources, such as universities may be employed. A data repository may contains model data, scenario data (such as input and output), and a web based user interface. Further, and as illustrated with reference to FIG. 4, multiple analysts 24 and support staff 50 may work in cooperation using the system 10 and methods herein presented.

Figure 5:
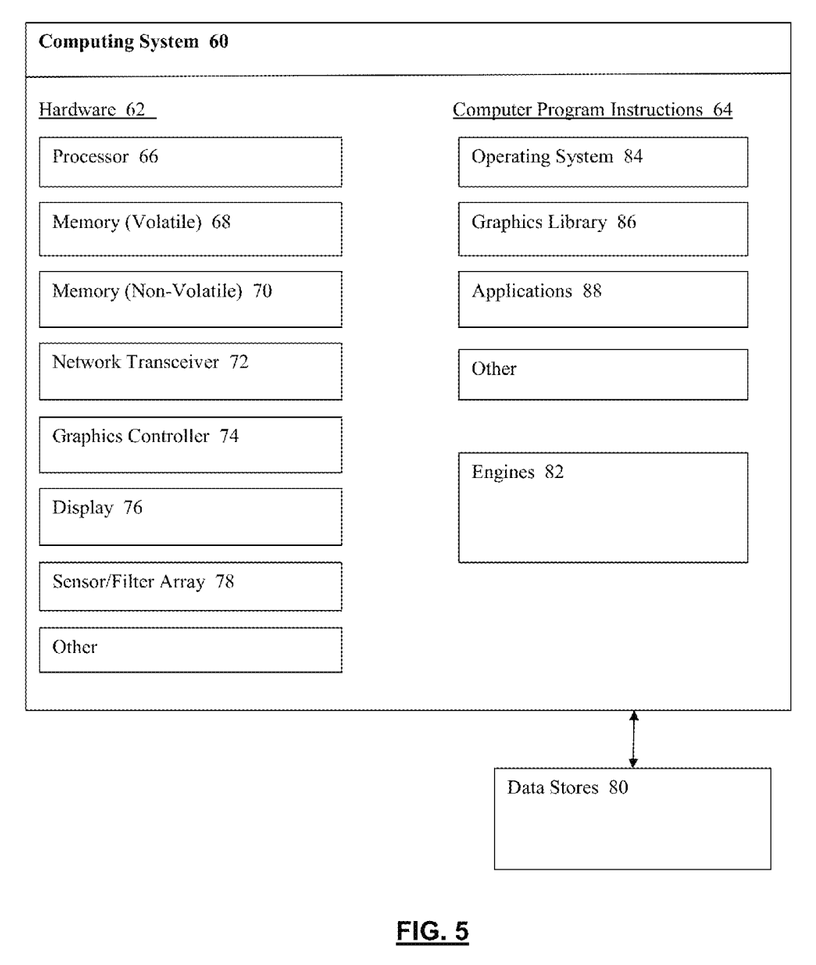
FIG. 5 is a diagrammatical illustration of a computing system for providing a strategic model using ontology states and models in accordance with certain embodiments.

One embodiment, herein described with reference to FIG. 5, includes a computing system 60 for providing a model using ontology states and models accessed from storage or web sites, as above described with reference to FIG. 1. The computer system 60, described by way of non-limiting example, includes hardware 62 and computer program instructions 64 that together permit the model to be presented within the user interface 22, earlier described with reference to FIG. 1. The computing system 60 represents one possible system for carrying out the steps of FIG. 3, and methods as herein described. The computing system 60 may include one or more computing devices which may be general purpose computing devices, such as personal computers, servers, in-vehicle computers, and the like. In various embodiments, the computing device(s) may be implemented as stand-alone devices, as virtual devices, as distributed devices, as cooperative devices, and the like. With continued reference to FIG. 5, the hardware 62 may comprise at least one processor 66, volatile memory 68 and non-volatile memory 70, a network transceiver 72, a graphics controller 74, a display 76, a sensory/filter array 78 (such as cameras, microphones, keyboards, mouse, biometric sensors, filters, and the like), a set of data stores 80, and/or other such components. The computer program instructions 64 may include applications for displaying one or more models on the user interface 22. The computer program instructions 64 may also include engines 82 including the execution and analysis engines 16, 18 and the reasoner 12, as above described. The computer program instructions 64 may also include operating system 84, a graphics library 86, and applications 88 running on the computing system.

By way of example, the flowchart and block diagrams herein presented, by way of example, illustrate architecture, functionality, and operation of possible implementations of systems, methods and computer program products according to various embodiments. Each block in the flowchart or block diagram may represent a module, segment, or portion of code, which comprises one or more executable instructions for implementing the specified logical function or functions. It is noted that in some alternative implementations, the functions in the blocks may occur out of the order noted. By way of non-limiting example, two blocks shown in succession may, in fact, be executed substantially concurrently, or the blocks may sometimes be executed in the reverse order, depending upon the functionality involved. It will also be noted that each block of the block diagrams and flowcharts, and combinations of blocks in the block diagram and flowchart illustrations, may be implemented by special purpose hardware-based systems that perform the specified functions or acts, or combinations of special purpose hardware and computer instructions.

As will be appreciated by one skilled in the art, aspects of various embodiments may be embodied as a system, method or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of various embodiments may take the form of a computer program product embodied in one or more computer readable media having computer readable program code embodied thereon. It is understood that the computer implemented method herein described operates with readable media relating to non-transitory media, wherein the non-transitory computer-readable media comprise all computer-readable media, with the sole exception being a transitory, propagating signal.

Any combination of one or more computer readable media may be utilized. A computer readable medium may be a computer readable signal medium or a computer readable storage medium. A computer readable storage medium may be, by way of non-limiting example, but not limited to, an electronic, magnetic, optical, electromagnetic, infrared, or semiconductor system, apparatus, or device, or any suitable combination of the foregoing. More specific non-limiting examples of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, by way of non-limiting example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, and the like, or any suitable combination thereof. Computer program code for carrying out operations for aspects of various embodiments may be written in any combination of one or more programming languages, including an object oriented programming language such as Java, Smalltalk, C++ or the like and conventional procedural programming languages, such as the "C" programming language or similar programming languages. They may also be written in a specialized language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (by way of non-limiting example, through the Internet using an Internet Service Provider).

Aspects of various embodiments are herein described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the embodiments have been described relative to various selected non-limiting examples, there are numerous variations and modifications that will be readily apparent to those skilled in the art in light of the above teachings. It is therefore to be understood that, within the scope of the claims hereto attached and supported by this specification, the embodiments may be practiced other than as specifically described.

That which is claimed is:

1. A computer implemented method for meeting an economic challenge, the method comprising:
   identifying an economic challenge;
   inputting a specification of the challenge into a computer through a user interface operable therewith, wherein the inputting includes inputting a structured document having a field for an economic output, a nation of interest and starting conditions for the challenge;
   receiving the specification from the user interface by a reasoner processor;
   searching a library by the reasoner processor for locating data and at least one model applicable to the challenge;
   developing an ontology data set from the located data and developing an ontology model set from the at least one located model by the reasoner processor, wherein the developing comprises a forward and backward chaining reasoner process which draws from the ontology model set and the ontology data set;
   storing the ontology data set and the ontology model set in a database;
   developing a selected data set and at least one selected model of the specification by the reasoner processor accessing the database for identifying a solution to the challenge;
   tagging the selected data set and the at least one selected model for providing information therefor;
   executing the at least one selected model using the selected data set by an execution engine of the processor for providing results data responsive to the field for an economic output, the nation of interest and the starting conditions for the challenge;
   storing the results data resulting data from the at least one executed selected model in a results database;
   representing the results data and relationships therebetween in a visual ontology;
   transferring the results data from the results database to a visualization engine of the processor for providing visual images of the results data resulting from the structured document of the specification; and
   selecting at least one visualized image of the results data by the reasoner processor for describing the challenge in a manner for meeting the challenge.

2. The method according to claim 1, wherein the library database searching step comprises searching a global system of interconnected computer networks.

3. The method according to claim 1, wherein the specification inputting comprises inputting natural language for the receiving by the reasoner processor.

4. The method according to claim 1, wherein the structured document comprises a computer language for structuring, storing and transporting data representing the specification in a format readable by a human and a machine.

5. The method according to claim 1, wherein the ontology developing comprises the step of the reasoner processor communicating with the library database through forward and backwards chains sufficient for providing completed model and data set chains for examination thereof, and for associating a confidence indicator with each model set and data set.

6. The method according to claim 5, wherein the reasoner processor scores each chain based on a function of the confidence indicators, and wherein the reasoner processor rejects chains based on a threshold level score.

7. The method according to claim 1, wherein the tagging of the selected data set comprises providing contents, format, timescale and a confidence function for the selected data set.

8. The method according to claim 1, wherein the tagging of the at least one selected model comprises providing input contents and format, output and a confidence function.

9. The method according to claim 1, wherein the executing of the at least one selected model comprises at least one executing the model using code libraries, executing the model using external programs, and executing the model using visual machines.

10. The method according to claim 9, wherein the code libraries are stored in the results database.

11. The method according to claim 9, wherein the external programs are stored in other than the results database.

12. The method according to claim 9, wherein the virtual machines are accessed via a cloud server.

13. A computer implemented method for meeting an economic challenge, the method comprising:
inputting a specification of a challenge into a computer through a user interface operable therewith, wherein the inputting includes inputting a structured document having a field for an economic output, a nation of interest and starting conditions for the challenge;
receiving the specification from the user interface by a reasoner processor;
developing an ontology data set and developing an ontology model set from preselected data with the reasoner processor, wherein the developing comprises a forward and backward chaining reasoner process which draws from the ontology model set and the ontology data set;
developing a selected data set and a selected model of the specification by the reasoner processor accessing the database for identifying a solution to the challenge;
tagging the selected data set and the selected model for providing information therefor;
executing the selected model using the selected data set by an execution engine of the processor for providing results data responsive to the field for an economic output, the nation of interest and the starting conditions for the challenge;
representing the results data and relationships therebetween in a visual ontology;
transferring the results data from the results database to a visualization engine of the processor for providing visual images of the results data resulting from the structured document of the specification; and
selecting at least one visualized image of the results data by the reasoner processor for describing the challenge in a manner for meeting the challenge.

14. The method according to claim 13, wherein the ontology developing comprises the step of the reasoner processor communicating with the library database through forward and backwards chains sufficient for providing completed model and data set chains for examination thereof, and for associating a confidence indicator with each model set and data set.

15. The method according to claim 14, wherein the reasoner processor scores each chain based on a function of the confidence indicators, and wherein the reasoner processor rejects chains based on a threshold level score.

16. The method according to claim 13, further comprising searching a global system of interconnected computer networks for locating data and models applicable to the challenge.

17. The method according to claim 13, further comprising:
storing the ontology data set and the ontology model set in at least one of an ontology data database, an ontology model database, and a combination thereof; and
storing the results data resulting data from the executed selected model in a results database.

18. The method according to claim 13, wherein the specification inputting comprises inputting at least one of inputting natural language and inputting a structured document.

19. A computer system for meeting an economic challenge, the system comprising:
a reasoner processor operable for receiving a structured document having a field for an economic output, a nation of interest and starting conditions for the economic challenge;
a library database operable with the reasoner processor to locate data and at least one model applicable to the challenge, wherein the reasoner processor develops a selected data set and develops at least one selected model of the specification using a forward and backward chaining reasoner process which draws from the at least one selected model and the selected data set to identify a solution to the challenge and tag the selected data set and the at least one selected model for providing information therefor;
an execution engine operable with the reasoner processor to execute the at least one selected model using the selected data set for providing results data responsive to the field for an economic output, the nation of interest and the starting conditions for the challenge; and
a visualization engine operable with the execution engine to represent the results data and relationships therebetween in a visualization ontology for the reasoner processor providing visual images of the results data resulting from the specification.

20. The system according to claim 19, further comprising a first user interface operable with the reasoner processor to receive a specification of a challenge.

21. The system according to claim 20, further comprising a second user interface operable with the visualization engine to select at least one visualized image of the results data for describing the challenge in a manner for planning the strategy to meet the challenge.

22. The system according to claim 19, further comprising data storage for storing the results data resulting data from the at least one executed selected model in a results database.

23. The system according to claim 19 further comprising:
first data storage operable with the reasoner processor for storing an ontology data set from the data located through the global system; and
second data storage operable with the reasoner processor for storing an ontology model set from the models located through the global system.

24. The system according to claim 19, further comprising a global system of interconnected computer networks including the library database.

* * * * *